(12) United States Patent
Yamada

(10) Patent No.: US 7,404,768 B2
(45) Date of Patent: Jul. 29, 2008

(54) TELESCOPIC SHAFT FOR MOTOR VEHICLE STEERING

(75) Inventor: Yasuhisa Yamada, Gunma-ken (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 120 days.

(21) Appl. No.: 10/563,324

(22) PCT Filed: Jun. 11, 2004

(86) PCT No.: PCT/JP2004/008583

§ 371 (c)(1),
(2), (4) Date: Dec. 30, 2005

(87) PCT Pub. No.: WO2005/002947

PCT Pub. Date: Jan. 13, 2005

(65) Prior Publication Data

US 2006/0252559 A1   Nov. 9, 2006

(30) Foreign Application Priority Data

Jul. 2, 2003   (JP)   ............................. 2003-190514

(51) Int. Cl.
*F16C 3/06*   (2006.01)
(52) U.S. Cl. ........................................ 464/167; 384/54
(58) Field of Classification Search ................ 267/158, 267/163, 164; 464/167, 168; 74/492, 493; 280/775; 384/49–51, 54

See application file for complete search history.

(56) References Cited

U.S. PATENT DOCUMENTS

| | | | |
|---|---|---|---|
| 2,607,257 A | * | 8/1952 | Hadden .................. 267/163 X |
| 3,169,407 A | | 2/1965 | Newell |
| 3,356,424 A | * | 12/1967 | Edwards .................. 464/168 X |
| 3,392,599 A | | 7/1968 | White et al. |
| 3,444,753 A | | 5/1969 | Runkle |
| 3,604,285 A | | 9/1971 | Erland et al. |
| 3,879,093 A | | 4/1975 | Betrix |
| 4,012,925 A | | 3/1977 | Krude |
| 4,280,341 A | | 7/1981 | Krude |
| 4,357,137 A | | 11/1982 | Brown |

(Continued)

FOREIGN PATENT DOCUMENTS

AU   234387   12/1959

(Continued)

*Primary Examiner*—Greg Binda
(74) *Attorney, Agent, or Firm*—Miles & Stockbridge PC

(57) ABSTRACT

A telescopic shaft for vehicle steering has first and second torque transferring members. The first torque transferring member is interposed, with an elastic body in between, between axial grooves formed in an outer peripheral surface of a male shaft and an inner peripheral surface of a female shaft. The second torque transferring member is interposed between other axial grooves formed in the outer peripheral surface of the male shaft and in the inner peripheral surface of the female shaft. The elastic body has transferring-member-side contact portions contacting the first torque transferring member, shaft-side contact portions contacting groove surfaces of the axial groove of the male shaft or the female shaft, and a biasing portion for elastically urging the transferring-member-side contact portions and the shaft-side contact portions away from each other. Rigidity of the transferring-member-side contact portions is different from that of the shaft-side contact portions.

31 Claims, 10 Drawing Sheets

U.S. PATENT DOCUMENTS

| | | | |
|---|---|---|---|
| 4,384,861 A | 5/1983 | Lange et al. | |
| 4,500,141 A | 2/1985 | Daugherty | |
| 4,509,386 A | 4/1985 | Kimberlin | |
| 4,667,530 A | 5/1987 | Mettler et al. | |
| 4,705,491 A | 11/1987 | Andersson | |
| 5,184,978 A | 2/1993 | Fillmore et al. | |
| 5,226,853 A | 7/1993 | Courgeon | |
| 5,235,734 A | 8/1993 | DuRocher | |
| 5,460,574 A | 10/1995 | Hobaugh | |
| 5,542,343 A | 8/1996 | Martin | |
| 5,709,605 A | 1/1998 | Riefe et al. | |
| 5,899,811 A | 5/1999 | Kishibuchi et al. | |
| 6,035,740 A | 3/2000 | Budaker et al. | |
| 6,174,239 B1 | 1/2001 | Guimbretiere | |
| 6,279,953 B1 | 8/2001 | Cartwright | |
| 6,293,872 B1 | 9/2001 | Ganser | |
| 6,343,993 B1 | 2/2002 | Duval et al. | |
| 6,364,778 B1 | 4/2002 | Beitzel et al. | |
| 6,474,868 B2 | 11/2002 | Geyer et al. | |
| 6,510,756 B2 | 1/2003 | Aota | |
| 6,533,459 B2 | 3/2003 | Podhajecki et al. | |
| 6,557,433 B1 | 5/2003 | Castellon | |
| 6,620,050 B2 | 9/2003 | Park | |
| 6,729,648 B2 | 5/2004 | Ulintz | |
| 6,733,039 B2 | 5/2004 | Honda et al. | |
| 6,755,746 B2 | 6/2004 | Barnley et al. | |
| 6,761,503 B2 | 7/2004 | Breese | |
| 6,893,353 B2 | 5/2005 | Dutkiewicz et al. | |
| 6,902,487 B2 | 6/2005 | Welschof | |
| 6,921,338 B2 | 7/2005 | Cermak et al. | |
| 6,948,401 B2 | 9/2005 | Zernickel et al. | |
| 7,147,375 B2 | 12/2006 | Zernickel et al. | |
| 7,226,360 B2 | 6/2007 | Lyon et al. | |
| 2001/0006564 A1 | 7/2001 | Geyer et al. | |
| 2002/0177485 A1 | 11/2002 | Cermack et al. | |
| 2003/0073503 A1 | 4/2003 | Perrow | |
| 2004/0245759 A1 | 12/2004 | Yamada et al. | |
| 2005/0022623 A1 | 2/2005 | Reiche et al. | |
| 2005/0070365 A1 | 3/2005 | Riefe et al. | |
| 2005/0104354 A1 | 5/2005 | Yamada et al. | |
| 2005/0257639 A1 | 11/2005 | Yamada | |
| 2006/0012161 A1 | 1/2006 | Yamada | |
| 2006/0039747 A1 | 2/2006 | Shoda et al. | |
| 2006/0053934 A1 | 3/2006 | Bahr et al. | |
| 2006/0060022 A1 | 3/2006 | Yamada | |
| 2006/0068924 A1* | 3/2006 | Yamada | 464/167 |
| 2006/0082120 A1 | 4/2006 | Taniguchi et al. | |
| 2006/0156855 A1 | 7/2006 | Yukawa et al. | |
| 2006/0162989 A1 | 7/2006 | Yamada | |
| 2006/0181069 A1* | 8/2006 | Yamada | 280/775 |
| 2006/0252559 A1 | 11/2006 | Yamada | |
| 2007/0157754 A1 | 7/2007 | Yamada | |
| 2007/0273137 A1 | 11/2007 | Yamada et al. | |

FOREIGN PATENT DOCUMENTS

| | | |
|---|---|---|
| DE | 37 30 393 | 3/1989 |
| DE | 37 30 393 A1 | 3/1989 |
| DE | 19538303 | 4/1997 |
| DE | 19820291 | 11/1999 |
| DE | 198 24 477 | 12/1999 |
| DE | 19905350 | 8/2000 |
| DE | 102 02 899 | 8/2002 |
| DE | 20212294 | 10/2003 |
| EP | 0 281 723 A2 | 9/1988 |
| EP | 1 065 397 | 1/2001 |
| EP | 1 078 843 | 2/2001 |
| EP | 1106851 | 6/2001 |
| EP | 1 167 790 | 1/2002 |
| EP | 1247719 | 10/2002 |
| EP | 1512607 | 3/2005 |
| EP | 1547903 | 6/2005 |
| EP | 1557338 | 7/2005 |
| EP | 1568569 | 8/2005 |
| EP | 1 588 921 A1 | 10/2005 |
| ES | 2 161 127 | 11/2001 |
| FR | 2795787 | 1/2001 |
| GB | 2344084 | 5/2000 |
| GB | 2362688 | 11/2001 |
| GB | 2 373 551 | 9/2002 |
| JP | 45-19207 | 8/1970 |
| JP | 62-244758 | 10/1987 |
| JP | UM-1-145670 | 10/1989 |
| JP | UM-4-43522 | 4/1992 |
| JP | 29-16708 | 6/1992 |
| JP | UM 4-123775 | 11/1992 |
| JP | 2000-38142 | 2/2000 |
| JP | 2000-159042 | 6/2000 |
| JP | 2000-205288 | 7/2000 |
| JP | 2000-337395 | 12/2000 |
| JP | 2001-50293 | 2/2001 |
| JP | 2001-193738 | 7/2001 |
| JP | 2001-239944 | 9/2001 |
| JP | 2002-46633 | 2/2002 |
| JP | 2002-286034 | 10/2002 |
| JP | 2002-539033 | 11/2002 |
| SU | 398786 | 9/1973 |
| WO | WO 86/07120 | 12/1986 |
| WO | WO 99/08920 | 2/1999 |
| WO | WO 00/55028 | 9/2000 |
| WO | WO 2004/033270 A | 4/2004 |

* cited by examiner

FIG. 4A
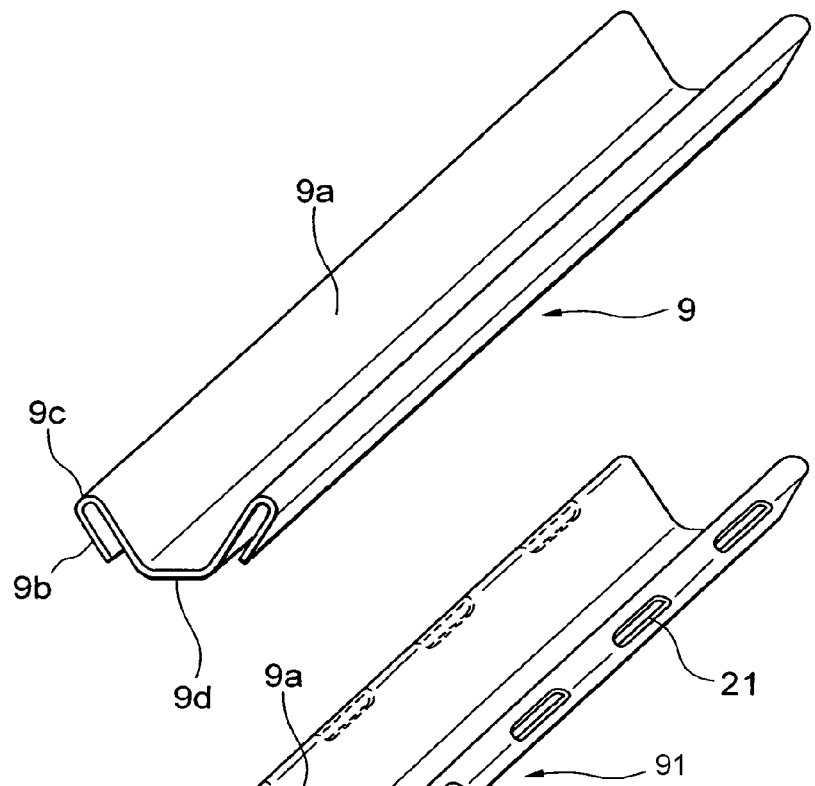
FIG. 4B
FIG. 4C
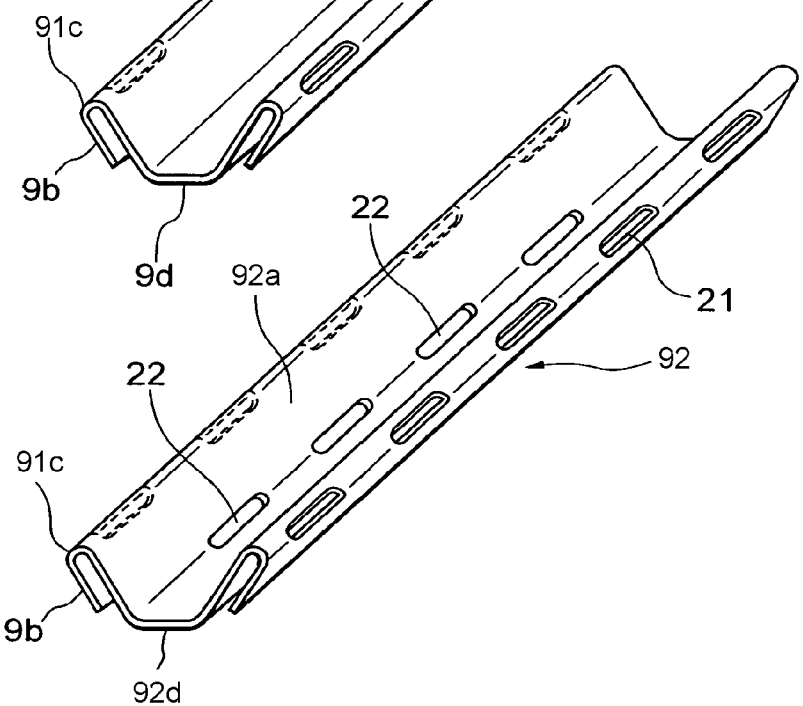

TELESCOPIC SHAFT FOR MOTOR VEHICLE STEERING

TECHNICAL FIELD

The present invention relates to a telescopic (extensible/retractable) shaft for a vehicle steering, assembled in a steering shaft of a vehicle and constructed by fitting a male shaft and a female shaft to each other so as to be unable to rotate but to be slidable.

BACKGROUND ART

A requirement for a telescopic shaft of a steering mechanism unit of a vehicle includes absorbing an axis-directional displacement during vehicle travel so as to inhibit the transfer of the displacement and vibrations to a steering wheel. Further, another requirement includes a function of shifting a position of the steering wheel in an axis-direction and adjusting this position in order for a driver to obtain a position optimal for driving the vehicle.

In all these cases, the telescopic shaft is required to reduce backlash or rattling noises, a feeling of the backlash on the steering wheel, and slide resistance when sliding in the axis-direction.

Such being the case, a conventional contrivance is that metallic noises, metal butting noises, etc., are absorbed or reduced by coating a male shaft of the telescopic shaft with a nylon film and applying grease over a slide portion. Thus, the slide resistance and the backlash in a rotating direction are reduced.

There is, however, a case where abrasion of the nylon film progresses in the course of use, and the backlash in the rotating direction increases. Further, when exposed to a high temperature in an engine compartment, the nylon film suffers a volumetric change with the result being that the slide resistance conspicuously rises and the abrasion is highly accelerated, wherein the backlash in the rotating direction increases.

Under such circumstances, according to telescopic shafts disclosed in German Patent Publication DE3730393C2, Japanese Patent Application Laid-Open No. 2001-50293 and Japanese Patent Application Laid-Open No. 2001-193738, a rolling member and a preload elastic member, which preloads a male shaft and a female shaft, are interposed between an outer peripheral surface of the male shaft and an inner peripheral surface of the female shaft. With this configuration, when sliding, the elastic member preloads the rolling member against the female shaft to such an extent as not to cause backlash, whereby backlash between the male shaft and the female shaft can be prevented. Further, when transferring the torque, the elastic member can restrict the rolling member in a peripheral direction, and the male shaft and the female shaft can prevent backlash in the rotating direction thereof.

According to all these patent documents, however, the elastic member for preloading the rolling member and a race portion abutting on the rolling member are made from different materials and take different shapes for their usage.

This is because the race portion abutting on the rolling member must bear a high contact surface pressure. This implies that the torque must be transferred via the rolling member, and hence the race portion abutting on the rolling member is required to be a hard and rigid member. By contrast, the elastic member that generates a biasing force is required to be made from a flexible material, as in the case of a spring.

From these points described above, according to the patent document, i.e., German Patent Publication DE3730393C2, the race portion abutting on the rolling member involves using a different material and a different shape, and, as a result, it follows that manufacturing costs rise.

Moreover, German Patent Publication DE3730393C2 exemplifies an example of a plate spring, wherein the race portion and the elastic member are made from a single material. However, the plate springs are connected via a web, so that the configuration becomes complicated, resulting in a rise in assembling cost. Further, as described above, for transferring the torque through the rolling member, it is difficult to utilize the plate spring to bear the contact surface pressure of the rolling member and to give the biasing force.

Furthermore, Japanese Patent Application Laid-Open No. 2001-193738 exemplifies an example, wherein the elastic member and the race portion are integrally formed. As in the case described above, however, for transferring the torque via the rolling member, it is difficult to utilize the plate spring to bear the contact surface pressure of the rolling member and to give the biasing force.

DISCLOSURE OF THE INVENTION

It is an object of the present invention, which was devised in view of the circumstances described above, to provide a telescopic shaft for a vehicle steering that is capable of actualizing a stable slide load and transferring a torque in a high-rigidity state.

To accomplish the above object, according to the present invention, a telescopic shaft for vehicle steering, which is assembled in a steering shaft of a vehicle and is constructed by fitting a male shaft and a female shaft to each other so as to be unable to rotate but to be slidable, has a first torque transferring member. The first torque transferring member is interposed via an elastic member between one line of axis-directional groove and one line of axis-directional groove formed respectively on an outer peripheral surface of the male shaft and on an inner peripheral surface of the female shaft. The elastic member includes a transferring-member-side contact portion abutting on the first torque transferring member, a shaft-side contact portion spaced away at a predetermined interval substantially in a peripheral direction from the transferring-member-side contact portion and abutting on a groove surface of the axis-directional groove of the male shaft or the female shaft, and a biasing portion elastically biasing the transferring-member-side contact portion and the shaft-side contact portion away from each other. The rigidity of the transferring-member-side contact portion is differentiated from a rigidity of the shaft-side contact portion.

Further, in the telescopic shaft for the vehicle steering according to the present invention, it is preferable that the first torque transferring member is a rolling member rolling when both of the male shaft and the female shaft make relative movements in the axis-direction. Further, the telescopic shaft can include a second torque transferring member interposed between another line of axis-directional groove and another line of axis-directional groove formed respectively on the outer peripheral surface of the male shaft and on the inner peripheral surface of the female shaft. The second torque transferring member is a slide member sliding when both of the male shaft and the female shaft make the relative movements in the axis-direction.

Moreover, in the telescopic shaft for the vehicle steering according to the present invention, the biasing portion of the elastic member can take a bent shape bent between the transferring-member-side contact portion and the shaft-side contact portion.

Further, in the telescopic shaft for the vehicle steering according to the present invention, the elastic member can be constructed of an integral molding product made from thin plate spring steel.

Still further, in the telescopic shaft for the vehicle steering according to present invention, surface hardness of the transferring-member-side contact portion can be set higher than surface hardness of a portion extending from the shaft-side contact portion to the biasing portion.

Yet further, in the telescopic shaft for a vehicle steering according to the present invention, the biasing portion can be formed with holes for reducing a biasing force.

Moreover, in the telescopic shaft for the vehicle steering according to the present invention, a plate thickness of the transferring-member-side contact portion can be set thicker than a plate thickness of a portion extending from the shaft-side contact portion to the biasing portion.

Still moreover, in the telescopic shaft for the vehicle steering according to the present invention, the transferring-member-side contact portion can be formed substantially in a circular arch shape.

BRIEF DESCRIPTION OF THE DRAWINGS

FIG. 4A is a perspective view of a plate spring according to the first embodiment; FIG. 4B is a perspective view of the plate spring according to a first modified example of the first embodiment; FIG. 4C is a perspective view of the plate spring according to a second modified example of the first embodiment;

EMBODIMENTS OF THE INVENTION

A telescopic (extensible/retractable) shaft for a vehicle steering according to embodiments of the present invention will hereinafter be described with reference to the drawings.

Whole Construction of Steering Shaft for Vehicle

Figure 1:
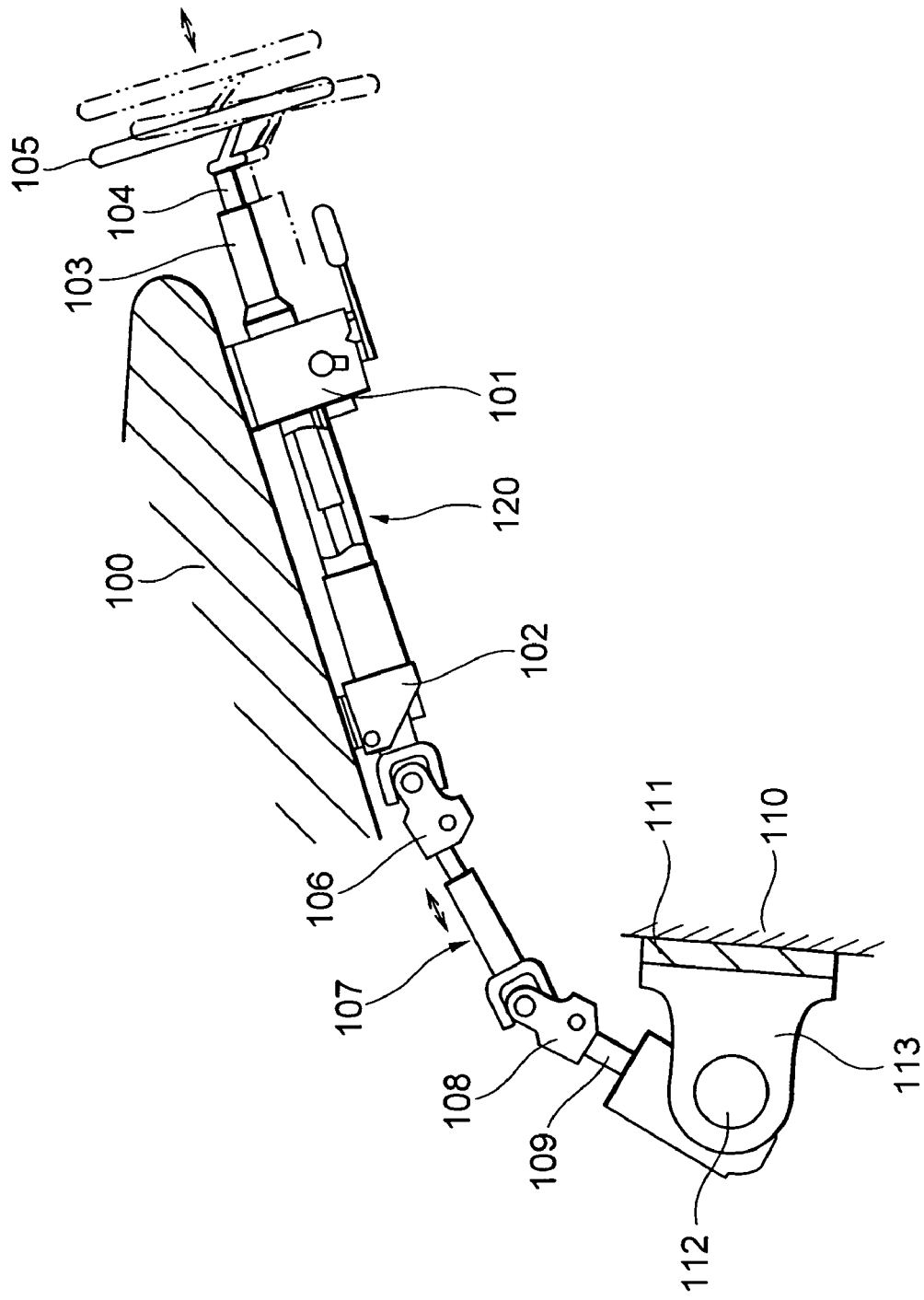
FIG. 1 is a side view of a steering mechanism unit of an vehicle, to which a telescopic shaft for a vehicle steering according to an embodiment of the present invention is applied.

FIG. 1 is a side view of a steering mechanism unit of an vehicle, to which the telescopic shaft for the vehicle steering according to the embodiment of the present invention is applied.

Referring to FIG. 1, the steering mechanism unit is constructed of an upper steering shaft portion 120 fitted via an upper bracket 101 and a lower bracket 102 to a vehicle body sided member 100 and including a steering column 103 and a steering shaft 104 rotatably held in the steering column 103. A steering wheel 105 is fitted to an upper side end of the steering shaft 104. A lower steering shaft portion 107 is connected via a universal joint 106 to a lower side end of the steering shaft 104. A pinion shaft 109 is connected via a steering shaft coupling 108 to the lower steering shaft portion 107. A steering rack shaft 112 is connected to the pinion shaft 109, and a steering rack support member 113 is fixed via an elastic body 111 to another frame 110 of the vehicle body in a way that supports the steering rack shaft 112.

Herein, the upper steering shaft portion 120 and the lower steering shaft portion 107 involve using the telescopic shaft for the vehicle steering (which will hereinafter simply be termed the telescopic shaft) according to the embodiment of the present invention. The lower steering shaft portion 107 is constructed by fitting a male shaft to a female shaft. This type of lower steering shaft portion 107 serves to absorb displacement in an axial direction that occurs when the vehicle travels without transmitting the displacement and vibrations to the steering wheel 105. This type of performance is desired in a case when the vehicle body adopts a sub-frame structure, wherein a member 100 for fixing an upper portion of the steering mechanism is separate from a frame 110 to which the steering rack support member 113 is fixed, and the steering rack support member 113 is fixedly fastened to the frame 110 via the elastic body 111, such as rubber. Further, another case is that an operator, when fastening the steering shaft coupling 108 to the pinion shaft 109, temporarily contracts the telescopic shaft and fits and fastens the coupling 108 to the pinion shaft 109. Therefore, a telescopic (extensible/retractable) function is needed. Moreover, the upper steering shaft portion 120 provided on the upper portion of the steering mechanism is constructed by fitting a male shaft to the female shaft. This type of upper steering shaft portion 120 is, however, required to have a function of shifting a position of the steering wheel 105 in the axial direction in order to obtain a position optimal for a driver to drive the vehicle and adjusting this position. It is therefore necessary to have a function of extending and retracting in the axial direction. In all the cases described above, it is desirable that the telescopic shaft reduce backlash noises at the fitting portion, a feeling of backlash on the steering wheel 105 and slide resistance caused when sliding in the axial direction.

First Embodiment

Figure 2:
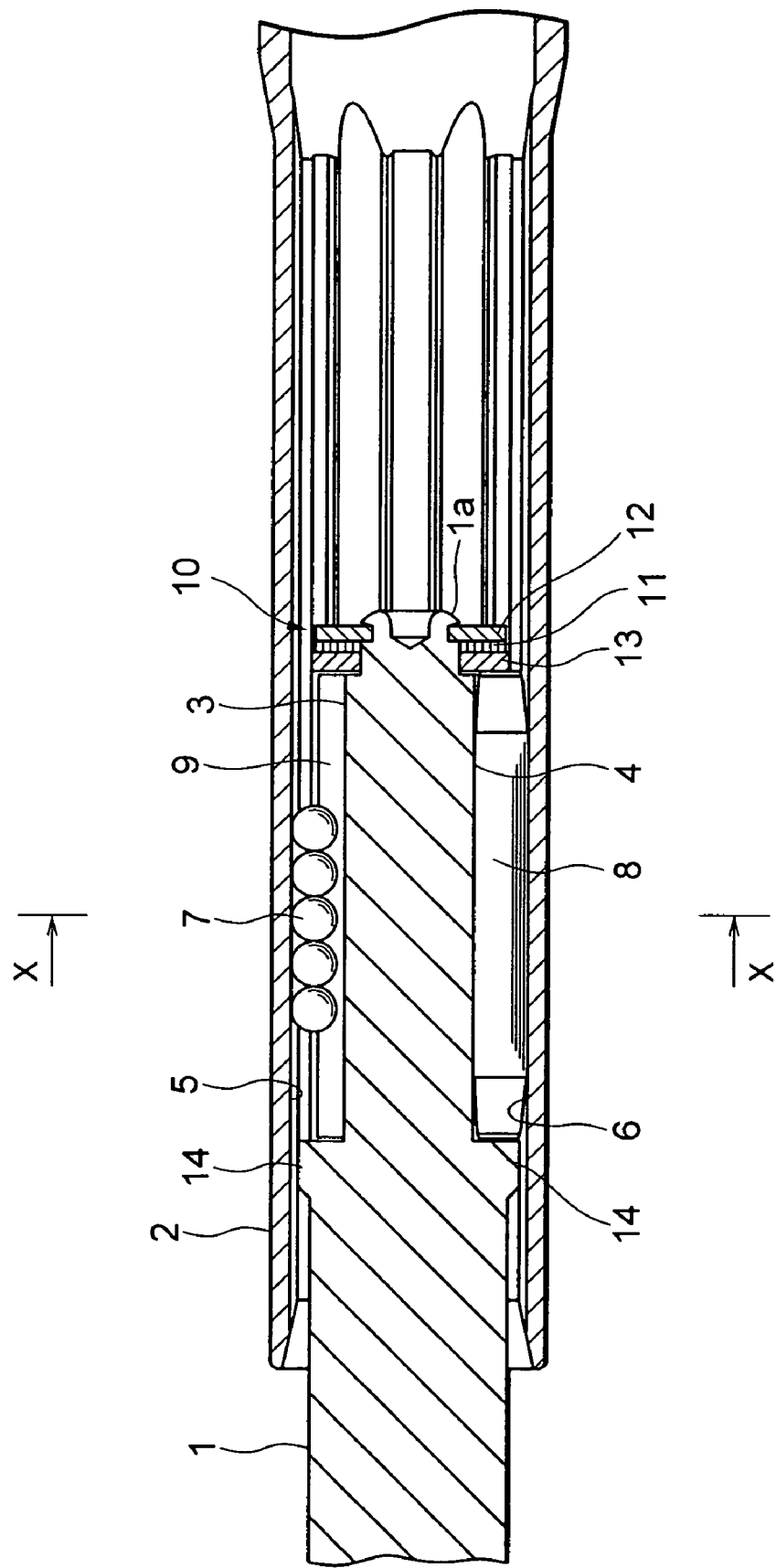
FIG. 2 is a vertical sectional view of the telescopic shaft for the vehicle steering according to a first embodiment of the present invention.

FIG. 2 is a vertical sectional view of the telescopic shaft for the vehicle steering according to a first embodiment of the present invention.

Figure 3:
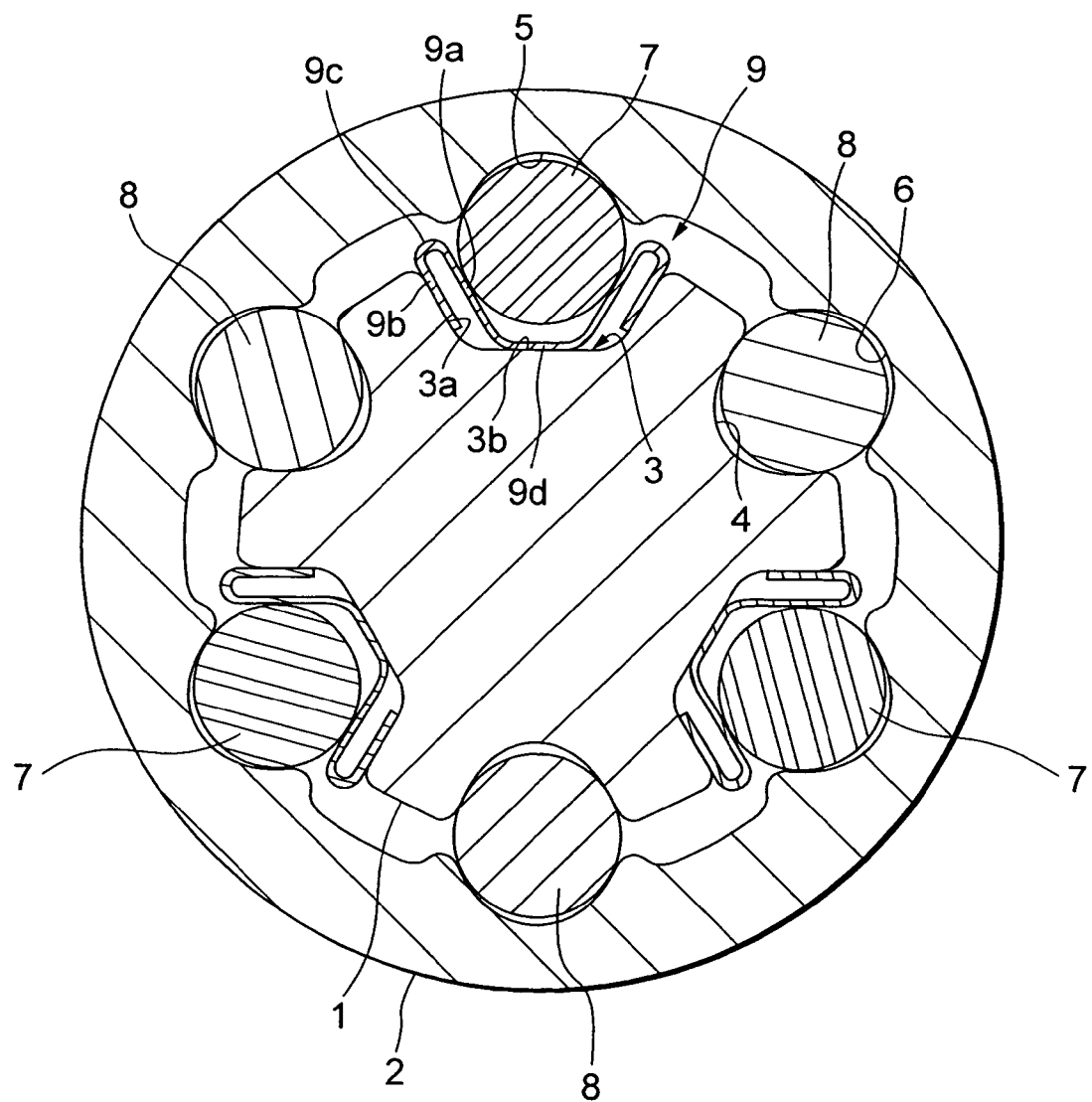
FIG. 3 is a cross sectional view taken along the line X-X in FIG. 2.

FIG. 3 is a cross sectional view taken along the line X-X in FIG. 2.

FIG. 4A is a perspective view of a plate spring according to the first embodiment. FIG. 4B is a perspective view of the plate spring according to a first modified example of the first embodiment. FIG. 4C is a perspective view of the plate spring according to a second modified example of the first embodiment.

As shown in FIG. 2, the telescopic shaft for the vehicle steering (which will hereinafter be simply referred to as the telescopic shaft) is constructed of a male shaft 1 and a female shaft 2 that are so fitted to each other as to be unable to rotate but to be slidable.

As shown in FIG. 3, three lines of axis-directional grooves 3 disposed equally at an interval (phase) of 120 degrees in a peripheral direction, are formed in a way that extends along an outer peripheral surface of the male shaft 1. Corresponding to these grooves, three lines of axis-directional grooves 5 disposed equally at an interval (phase) of 120 degrees in the peripheral direction, are also formed in a way that extends along an inner peripheral surface of the female shaft 2.

Between the axis-directional grooves 3 of the male shaft 1 and the axis-directional grooves 5 of the female shaft 2, plural rolling members or balls defined as rigid spherical members 7 rolling when relatively moving in the axis-directions of the two shafts 1, 2 are interposed to be able to roll. The axis-directional groove 5 of the female shaft 2 takes a circular-arc shape or Gothic arch shape in section.

The axis-directional groove 3 of the male shaft 1 is configured by a pair of flat side surfaces 3a showing line symmetry with respect to the diameter and inclined, and by a bottom surface 3b formed flat between the pair of flat side surfaces 3a.

A plate spring 9 abutting on the spherical member 7, and thus giving a preload thereto, is interposed between the axis-directional groove 3 of the male shaft 1 and the spherical member 7. The plate spring 9, which serves as an elastic member, may be constructed of an integral molding product made from thin plate spring steel.

This plate spring 9 integrally has spherical-member-side contact portions 9a abutting at two points on the spherical member 7, shaft-side contact portions 9b spaced away at a predetermined interval substantially in the peripheral direction from the respective spherical-member-side contact portions 9a and abutting on the respective flat side surfaces 3a of the axis-directional groove 3 of the male shaft 1. Biasing portions 9c each connect the spherical-member-side contact portion 9a and the shaft-side contact portion 9b on the side of an outer diameter and elastically bias the spherical-member-side contact portion 9a and the shaft-side contact portion 9b away from each other. A bottom portion 9d is face-to-face with the bottom surface 3b of the axis-directional groove 3 on the side of an inner diameter.

This biasing portion 9c takes substantially a U-shape, wherein its bottom portion is bent substantially in a circular arc shape. This biasing portion 9c with a bent shape can elastically bias the spherical-member-side contact portion 9a and the shaft-side contact portion 9b away from each other.

Thus, according to the first embodiment, the plate spring 9 integrally has the contact portions 9a abutting on the spherical member 7 and the biasing portions 9c generating the preload. Hence, it is essential to control the preload so as not to increase too much a contact surface pressure of the contact portion 9a upon the spherical member 7. Therefore, according to the first embodiment, the plate spring 9 is set to have such a structure that the preload (i.e., a load generated by the biasing portion 9c when relatively rotating the male shaft 1 around inside the female shaft 2) generated by the biasing portion 9c does not exceed an allowable value of the surface pressure caused by the contact portion 9a upon the spherical member 7.

As illustrated in FIG. 3, three lines of axis-directional grooves 4 disposed equally at an interval (phase) of 120 degrees in the peripheral direction, are formed in a way that extends on the outer peripheral surface of the male shaft 1. Corresponding to these grooves, three lines of axis-directional grooves 6 disposed equally at an interval (phase) of 120 degrees in the peripheral direction, are also formed in a way that extends on the inner peripheral surface of the female shaft 2.

Between the axis-directional grooves 4 of the male shaft 1 and the axis-directional grooves 6 of the female shaft 2 corresponding thereto, plural pieces of cylindrical rigid members 8 (which are also termed slide members or needle rollers in the present specification) sliding when the two shafts 1, 2 move relatively in the axis-direction, are interposed with a minute gap. These axis-directional grooves 4, 6 each take a circular-arc shape or Gothic arch shape in section.

As shown in FIG. 2, an end portion of the male shaft 1 is formed with a small-diameter portion 1a. This small-diameter portion 1a is provided with a stopper plate 10 regulating an axis-directional movement of the needle roller 8. This stopper plate 10 is constructed of an axis-directional preloading elastic member 11 consisting of a Belleville spring and a pair of flat plates 12, 13 for holding the axis-directional preloading elastic member 11 therebetween.

In the first embodiment, the stopper plate 10 is firmly fixed by plastically deforming by clinching or caulking to the small-diameter portion 1a in a way that fits the flat plate 13, the axis-directional preloading elastic member 11 and the flat plate 12 in this sequence to the small-diameter portion 1a. In this way, the stopper plate 10 is fixed in the axis-direction. It should be noted that a fixing method of the stopper plate 10 is not limited to plastically deforming by clinching or caulking and may involve employing means such as a stopper ring, a screwing means and a push nut. Further, the stopper plate 10 is so constructed as to be capable of preloading the needle roller 8 not to move in the axis-direction by the axis-directional preloading elastic member 11 (Belleville spring) in a way that butting the flat plate 13 against the needle roller 8.

Further, according to the first embodiment, six pieces of protruded portions 14 each taking substantially a circular arc shape and formed coaxially in the axis-direction with the six lines of axis-directional grooves 3, 4 on the outer peripheral surface of the male shaft 1, are fitted with gaps in the radial direction into the six lines of axis-directional grooves 5, 6 of the female shaft 2.

Accordingly, if the spherical member 7 or the cylindrical member 8 comes off the male shaft 1 or is damaged due to any cause, the protruded portions 14 of the male shaft 1 fit into the axis-directional grooves 5, 6 of the female shaft 2, whereby the male shaft 1 and the female shaft 2 can transfer torque and can perform a role of a fail-safe function.

Further, on this occasion, since the gaps are provided between the axis-directional grooves 5, 6 and the protruded portions 14, the driver can feel the great backlash through the steering wheel, and can perceive a fault or the like in the steering system.

Moreover, the protruded portions 14 are aligned in the axis-direction with the spherical members 7 and the cylindrical members 8. Therefore, the portions 14 serve as the stopper for regulating the axis-directional movements of the spherical members 7 and the cylindrical members 8 so as to reduce a possibility that the spherical members 7 and the cylindrical members 8 might come off. Thus, the fail-safe function may be further improved.

Furthermore, the protruded portions 14 are aligned in the axis-direction with the spherical members 7 and the cylindrical members 8, and it is therefore feasible to attain a compact configuration by reducing diameter-directional dimensions of the male shaft 1 and the female shaft 2.

Moreover, a lubricating agent may be applied between the axis-directional groove 3 of the male shaft 1, the axis-directional groove 5 of the female shaft 2, the plate spring 9 and the spherical member 7. Further, the lubricating agent may also be applied between the axis-directional groove 4 of the male shaft 1, and cylindrical member 8 and the axis-directional groove 6 of the female shaft 2.

In the thus-constructed telescopic shaft, the spherical members 7 are interposed between the male shaft 1 and the female shaft 2. The plate spring 9 preloads the spherical member 7 against the female shaft 2 to such an extent so as not to cause the backlash. When not transferring torque, it is therefore possible to surely prevent backlash between the male shaft 1 and the female shaft 2. Further, when making relative movements in the axis-direction, the male shaft 1 and the female shaft 2 can slide with a slide load stably without causing any backlash.

When transferring the torque, the plate springs 9 elastically deform and restrict the spherical members 7 in the peripheral direction, and the three lines of cylindrical members 8 interposed between the male shaft 1 and the female shaft 2 perform the principal role of transferring the torque.

For instance, when the torque is inputted from the male shaft 1, at an initial stage, there is no backlash because of being preloaded by the plate springs 9. The plate springs 9 generate reaction against the torque, thus transferring the torque. The whole torques are transferred in a state where the transmission torque between the male shaft 1, the plate springs 9, the spherical members 7 and the female shaft 2 is equilibrated with an input torque.

When the torque further increases, gaps in a rotating direction between the male shaft 1 and the female shaft 2 via the cylindrical members 8 disappear, and the increased amount of torque is thereafter transferred by the cylindrical members 8 through the male shaft 1 and the female shaft 2. Hence, it is feasible to surely prevent the backlash in the rotating direction between the male shaft 1 and the female shaft 2 and to transfer the torque in the state exhibiting the high rigidity.

From the construction explained so far, according to the first embodiment, the cylindrical members 8 are provided in addition to the spherical members 7. Therefore, when inputting great torque, a large proportion of the load quantity can be sustained by the cylindrical members 8. Accordingly, durability can be improved by decreasing the contact pressure between the axis-directional grooves 5 of the female shaft 2 and the spherical members 7, and, when handling large torque-loads, the torque can be transferred in a high-rigidity state.

Further, as the cylindrical members 8 abut on the male shaft 1 and the female shaft 2, the torsional torque upon the spherical members 7 is reduced, a lateral slide of the plate springs 9 is restrained, and, as a result, an excess of hysteresis can be restrained.

Thus, according to the first embodiment, the stable slide load can be actualized, and the torque can be transferred in the high-rigidity state by surely preventing the backlash in the rotating direction.

It is to be noted that the spherical members 7 are preferably rigid balls. It is also preferable that the rigid cylindrical members 8 are needle rollers.

The cylindrical member 8 (which will hereinafter be referred to as the needle roller) receives the load in line contact, and therefore has a variety of effects. For example, the contact pressure for the needle roller is kept lower than that of the ball, which receives the load in point contact. Accordingly, the following items are superior to the case of taking an all-line ball rolling structure.

An attenuation effect at the slide portion is greater than in the ball rolling structure. Hence, vibration absorbing performance is high.

The needle roller 8 is brought into micro-contact with the male shaft and the female shaft, and hence an amplitude of a slide load fluctuation can be restrained low, whereby vibrations due to this fluctuation are not transferred up to the steering.

If the same amount of torque is transferred, the contact pressure can be restrained lower by the needle roller, and therefore the space can be utilized effectively by enabling the length in the axis-direction to be shortened.

If the same amount of torque is transferred, the contact pressure can be restrained lower by the needle roller, and hence there is no necessity for an additional process for hardening the surface of the axis-directional groove of the female shaft by thermal treatment etc.

The number of components can be decreased. An assembling property can be enhanced. An assembly cost can be restrained.

As described above, the needle roller performs the key role for transferring the torque to between the male shaft 1 and the female shaft 2, and gets the slide-contact with the inner peripheral surface of the female shaft 2. The following are excellent points of the needle roller as compared with the conventional spline-fitting.

The needle roller is a product of mass-production and is therefore extremely low cost.

The needle roller is polished after the thermal treatment. Therefore, it has a high surface hardness and is excellent abrasion resistance.

The needle roller has been polished. Therefore, it has low surface roughness and a low coefficient of friction during sliding, thereby enabling the slide load to be kept low.

A length and layout of the needle roller can be changed depending on a usage condition, and consequently the needle roller is flexible to a variety of applications without changing the design concept.

A case where the coefficient of friction during sliding must be further decreased might arise depending the usage condition. At this time, the slide characteristic can be changed simply by executing the surface treatment upon only the needle roller. Hence, the needle roller is flexible to a variety of applications without changing the design concept.

The needle rollers each having a different outer diameter can be manufactured on the order of several microns at a low cost, whereby gaps between the male shaft and the needle roller and between the needle roller and the female shaft can be minimized by selecting the diameter of the needle roller. Hence, the rigidity of the shaft in the torsional direction can be easily improved.

Further, the plate springs 9 each includes, on the right and left sides, respectively, a pair of spherical-member-side contact portions 9a abutting at the two points on the spherical members 7, a pair of shaft-side contact portions 9b spaced away at the predetermined interval substantially in the peripheral direction from the spherical-member-side contact portions 9a and abutting on the flat side surfaces 3a of the axis-directional groove 3 of the male shaft 1, the pair of biasing portions 9c biasing elastically the spherical-member-side contact portions 9a and the shaft-side contact portions 9b in the direction of separating the portions 9a, 9b from each other, and the bottom portion 9d in the face-to-face relationship with the bottom surface 3b of the axis-directional groove 3.

This biasing portion 9c has a substantially U-shape, wherein its bottom portion is bent substantially in the circular arc shape. This biasing portion 9c can elastically bias the spherical-member-side contact portion 9a and the shaft-side contact portion 9b so as to be separated away from each other. Accordingly, the plate spring 9, with its spherical-member-side contact portion 9a being able to become sufficiently flexible through the biasing portion 9c, can ensure a sufficient amount of flexure.

Now, according to the first embodiment, as shown in FIGS. 3 and 4A, the spherical-member-side contact portions 9a of the plate spring abutting on the spherical member 7 have the high surface hardness (desirably equal to or higher than HRC40), and other portions (i.e., the shaft-side contact portions 9b, the biasing portion 9c and the bottom portion 9d) have a low surface hardness (desirably equal to or lower than HRC30). Note that the spherical-member-side contact portions 9a having the high surface hardness are, in FIG. 4A, a pair of flat and rectangular portions extending in the axis-direction and exhibiting, as a matter of course, bilateral symmetry.

With this configuration, the spherical-member-side contact portions 9a abutting on the spherical member 7 are rigid and are therefore capable of sufficiently bearing the stress occurred at the contact points with the spherical member 7.

By contrast, the portions exhibiting the low surface hardness are easily flexed when receiving the displacement, thereby making it possible to prevent occurrence of an excessive stress at the contact points with the spherical member 7.

Namely, providing the difference in degree of hardness (rigidity) aims at taking a balance between the surface pressure (stress) at the contact points and the preload occurred at the biasing portions 9c. If using a conventional integral molding product and the plate spring having the uniform plate thickness, the balance therebetween is extremely hard to take. It should be noted that the embodiment, which will hereinafter be exemplified, is a structure invented entirely for taking this balance.

In the first embodiment, for thus taking the preload balance of the plate spring 9, the rigidity of the spherical-member-side contact portions 9a of the plate spring 9 is set higher than the rigidity of the shaft-side contact portions 9b.

From what has been discussed above, according to the first embodiment, the plate spring 9 is provided with the space between the spherical-member-side contact portion 9a abutting on the spherical member 7 and the shaft-side contact portion 9b abutting on the axis-directional groove 3, and the elastic connection is established therebetween. With this contrivance, when setting, the stress occurred at the contact portion of the plate spring 9 with the spherical member 7 can be reduced, and the desired preload performance can be acquired over a long period of time by preventing a permanent strain of the plate spring 9 due to permanent deformation.

Furthermore, the plate spring 9 is capable of ensuring the sufficient amount of flexure, and the excessive load (stress) is applied to neither the spherical member 7 nor the plate spring 9. Hence, when transferring the torque, it is feasible to decrease the stress occurred at the contact point between the spherical member 7 and the plate spring 9, whereby the preload performance can be maintained by preventing [permanent strain] permanent deformation without causing high stress.

Moreover, the contact points with the spherical member 7 are made firmly, and the portions exhibiting the spring property are set to easily flex, thus making it compatible for the single member to have the race surfaces and the spring property. Further, the structure in the first embodiment is that the cylindrical members 8 mainly transfer the torque. Therefore, further excessive stress does not occur among the male shaft 1, the female shaft 2, the plate springs 9 and the spherical members 7.

Accordingly, the permanent strain of the plate spring 9 is prevented by hindering the occurrence of the excessive stress on the plate spring 9, thereby enabling the desired preload performance to be maintained over the long period of time. In addition, the dimensional accuracy is not required to be strictly managed. The plate spring 9 and the race portion can be made from the single material, thereby making it feasible to reduce the manufacturing cost in a way that facilitates the assembling.

Next, FIG. 4B is a perspective view of the plate spring 91 according to a first modified example of the first embodiment.

According to the first modified example, the biasing portions 91c, defined as the curled portions of the plate spring 91, are each formed with a plurality of holes 21, aligned in the axis-direction, for decreasing the biasing force. Thus, plate spring 91 may become flexible.

With this arrangement, none of the excessive stress is applied to the contact points with the spherical member 7. Namely, when the torque load is applied, the spherical member 7 relatively moves in the rotating direction, however, at this time, the biasing portion 91c is easily flexed, so that the excessive stress is not applied to the contact point with the spherical member 7. Note that the surface hardness may be, even when uniform on the whole, partially changed as in the first embodiment.

Next, FIG. 4C is a perspective view of the plate spring 92 according to a second modified example of the first embodiment.

A bent R-portion at the root of the plate spring 92, which is formed between the spherical-member-side contact portion 92a and the bottom surface 92d, is formed with a plurality of holes 22, aligned in the axis-direction, for decreasing the biasing force, thereby making it easy for the plate spring 92 to flex.

With this contrivance, none of the excessive stress is applied to the contact points with the spherical member 7. Namely, before the torque load is applied (at which time the stress occurs at the contact points of the plate spring 92 due to the preload generated by assembling), as the portion formed with the hole 22 in the bent R-portion of the plate spring 92 is flexible, none of the excessive stress is applied to the contact points of the plate spring 92 with the spherical member 7 when assembled. Note that the surface hardness may be, even when uniform on the whole, partially changed as in the first embodiment.

Second Embodiment

Figure 5:
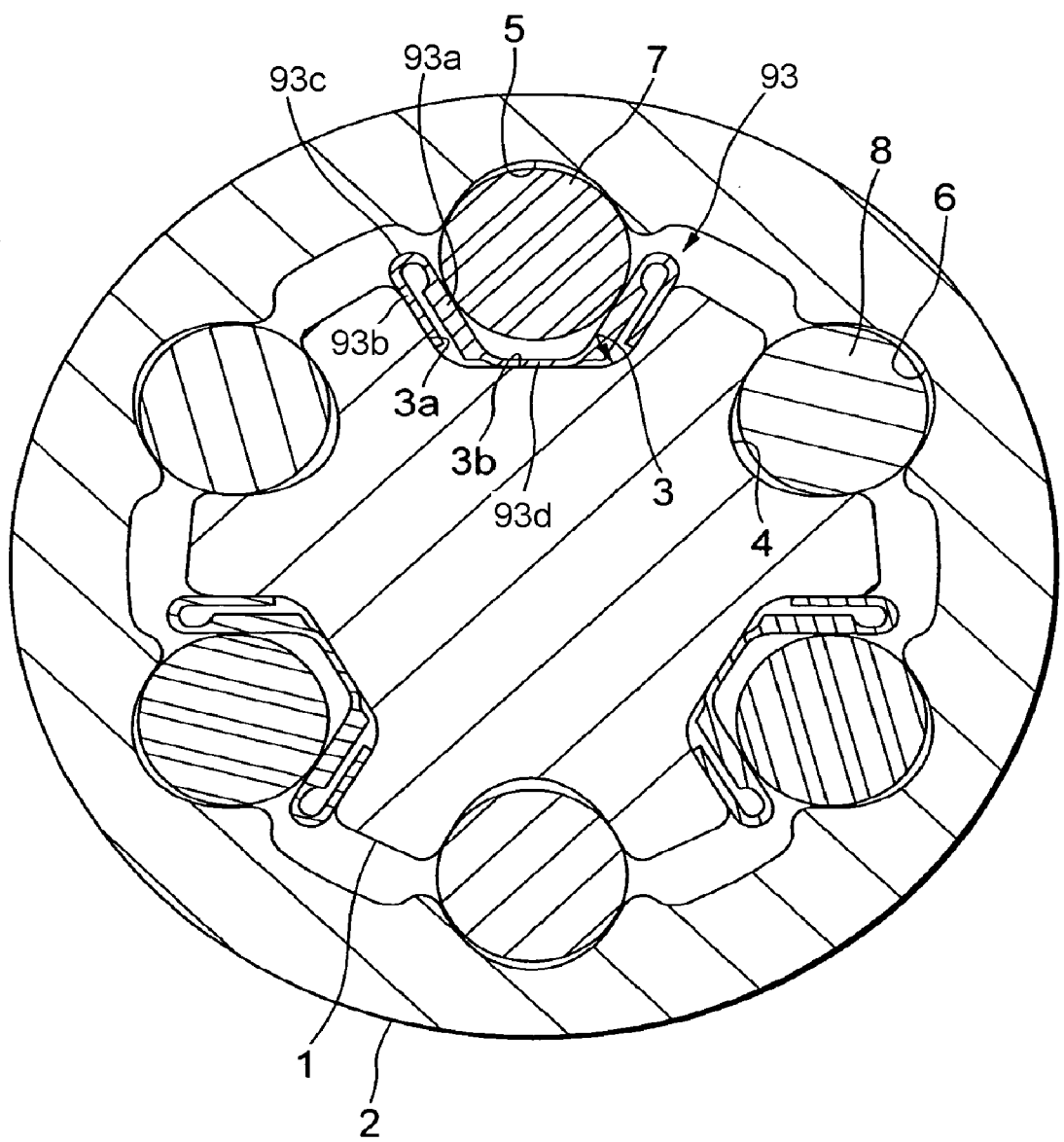
FIG. 5 is a cross sectional view taken along the line X-X in FIG. 2, showing the telescopic shaft for the vehicle steering according to a second embodiment of the present invention.

FIG. 5 is a cross sectional view taken along the line X-X in FIG. 2, showing the telescopic shaft for the vehicle steering according to a second embodiment of the present invention.

Figure 6A:
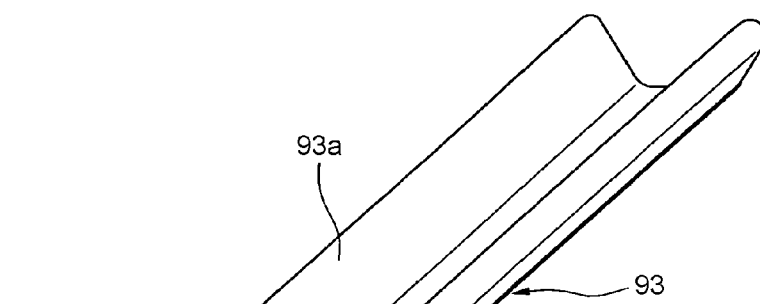
FIG. 6A is a perspective view of the plate spring according to the second embodiment.
Figure 6B:
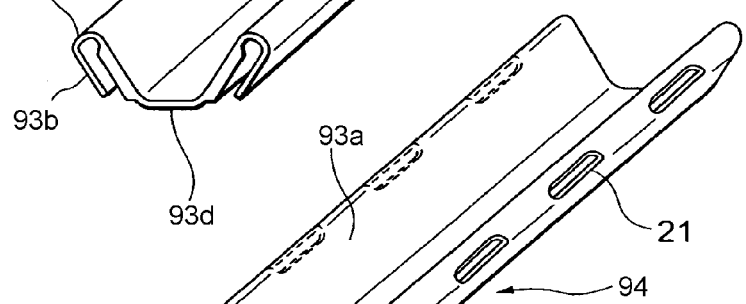
FIG. 6B is a perspective view of the plate spring according to a first modified example of the second embodiment.
Figure 6C:
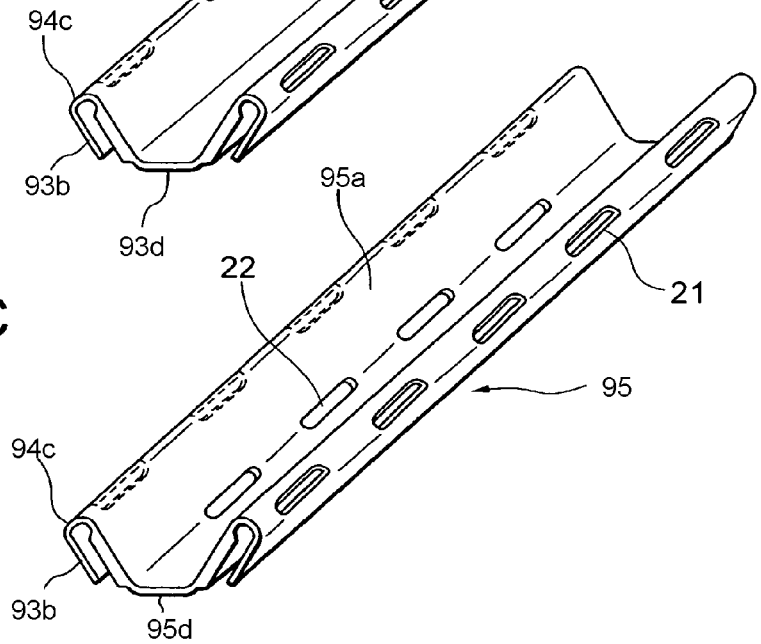
FIG. 6C is a perspective view of the plate spring according to a second modified example of the second embodiment.

FIG. 6A is a perspective view of the plate spring according to the second embodiment. FIG. 6B is a perspective view of the plate spring according to a first modified example of the second embodiment. FIG. 6C is a perspective view of the plate spring according to a second modified example of the second embodiment.

As shown in FIGS. 5 and 6A, according to the second embodiment, as compared with the first embodiment, the plate thickness of the spherical-member-side contact portion 93a abutting on the spherical member 7 is set thicker than a plate thickness of a portion extending from the shaft-side contact portion 93b to the biasing portion 93c. Thus, according to the second embodiment, the preload balance described above is taken in a way that differentiates the rigidities of the spherical-member-side contact portions 93a and the shaft-side contact portions 93b of the plate spring 93 from each other by giving a difference in the plate thicknesses between these two portions 93a and 93b. Note that the surface hardness may be, even when uniform on the whole, partially changed as in the first embodiment.

From what has been discussed above, according to the second embodiment, the plate springs 93 are capable of ensuring sufficient amount of flexing, with the excessive load (stress) being applied to neither the spherical members 7 nor the plate springs 93. When transferring the torque, the stress occurred at the contact portion between the spherical members 7 and the plate springs 93 can be reduced. With this contrivance, the high stress does not occur, and the preload performance can be maintained over a long period of time by preventing the [permanent strain] permanent deformation.

Moreover, the contact points with the spherical members 7 are made firmly, and the portions exhibiting the spring property are flexible, thus making it compatible for the single member to have the race surface and the spring property.

Accordingly, the permanent strain of the plate spring 93 is prevented by hindering the occurrence of the excessive stress on the plate spring 93, thereby enabling the desired preload performance to be maintained over the long period of time. In addition, the dimensional accuracy is not required to be strictly managed, and the plate spring 93 and the race portion can be made from the single material, thereby making it feasible to reduce the manufacturing cost in a way that facilitates the assembling.

Next, FIG. 6B is a perspective view of the plate spring 94 according to a first modified example of the second embodiment. According to the first modified example, the curled portions, as the biasing portions 94c of the plate spring 94, are each formed with a plurality of holes 21, aligned in the axis-direction, for decreasing the biasing force. Thus, plate spring 94 can easily be made flexible. With this arrangement, none of the excessive stress is applied to the contact point with the spherical member 7. Namely, when the torque load is applied, the spherical members 7 relatively move in the rotating direction, however, at this time, the biasing portions 94c (the curled portions) are flexible, so that the excessive stress is not applied to the contact points with the spherical members 7. Note that the surface hardness may be, even when uniform on the whole, partially changed as in the first embodiment.

Next, FIG. 6C is a perspective view of the plate spring 95 according to a second modified example of the second embodiment. A bent R-portion at the root of the plate spring 95, which is formed between the spherical-member-side contact portion 95a and the bottom surface 95d, is formed with a plurality of holes 22, aligned in the axis-direction, for decreasing the biasing force, thereby making the plate spring 95 easily flexible. With this contrivance, none of the excessive stress is applied to the contact points with the spherical member 7. Namely, before the torque load is applied (at which time the stress occurs at the contact point of the plate spring 95 due to the preload generated by assembling), as the portion formed with the hole 22 in the bent R-portion of the plate spring 95 is easily flexed, none of the excessive stress is applied to the contact points of the plate spring 95 with the spherical member 7 when assembled. Note that the surface hardness may be, even when uniform on the whole, partially changed as in the first embodiment.

Third Embodiment

Figure 7:
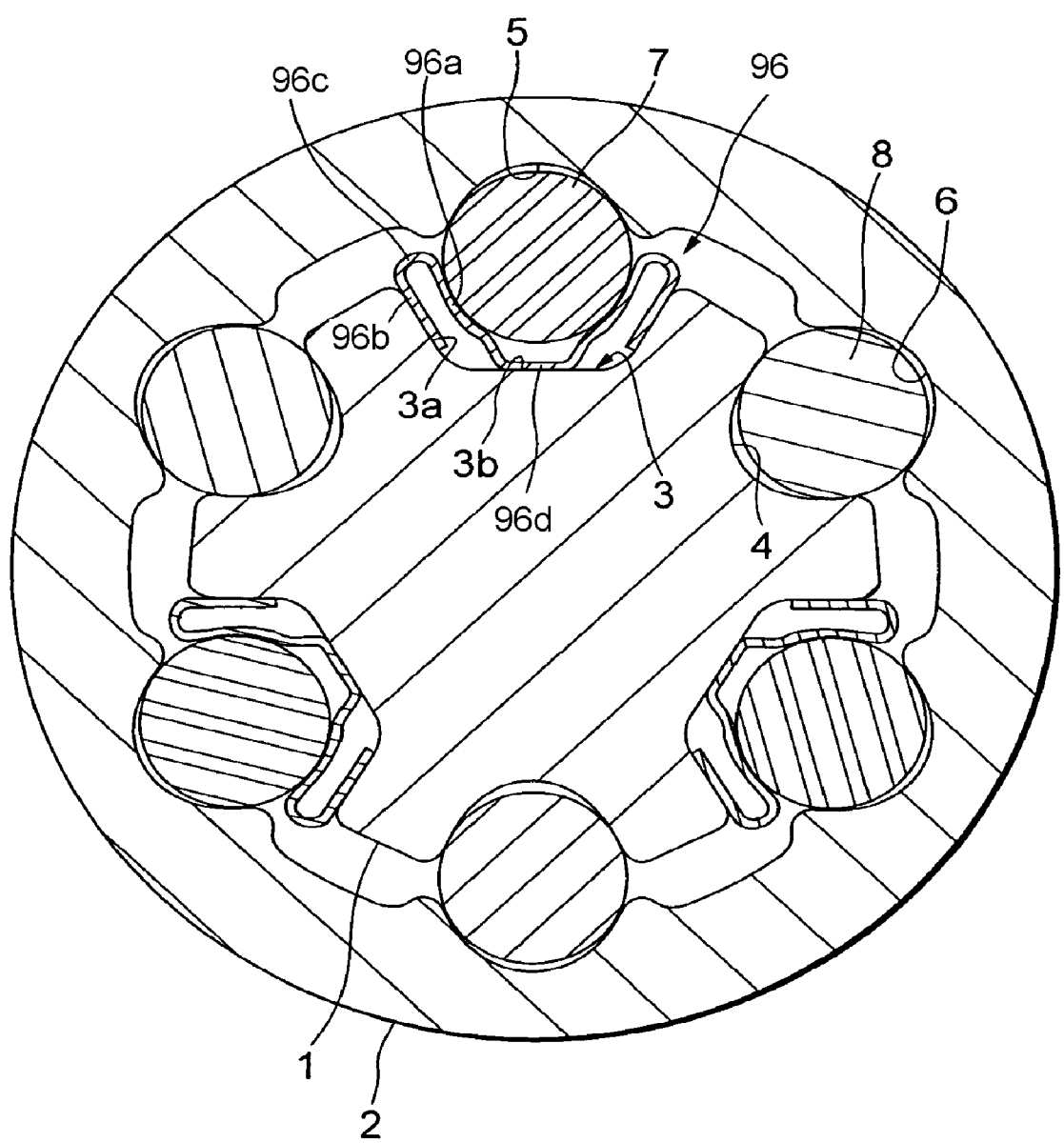
FIG. 7 is a cross sectional view taken along the line X-X in FIG. 2, showing the telescopic shaft for the vehicle steering according to a third embodiment of the present invention.

FIG. 7 is a cross sectional view taken along the line X-X in FIG. 2, showing the telescopic shaft for the vehicle steering according to a third embodiment of the present invention.

Figure 8A:
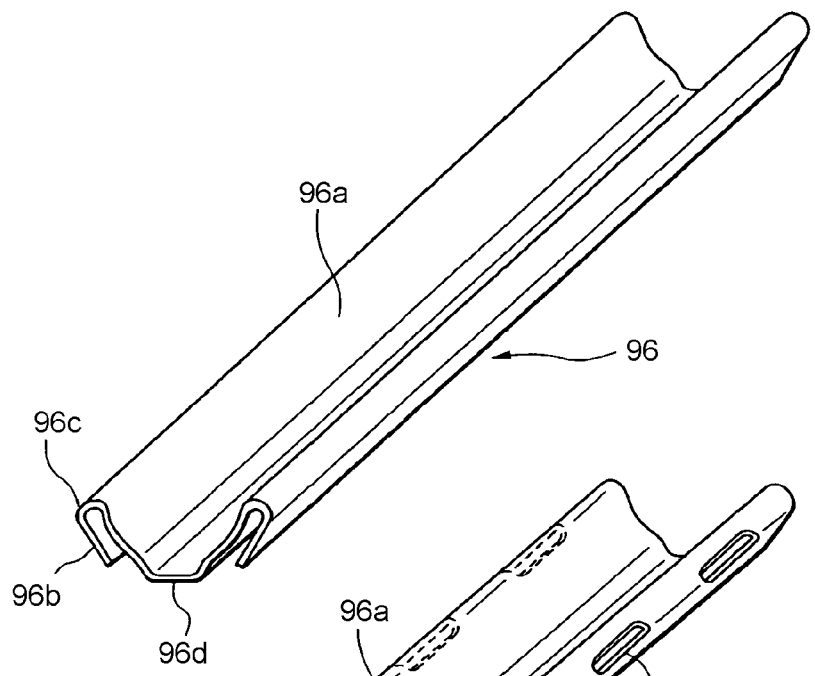
FIG. 8A is a perspective view of the plate spring according to the third embodiment.
Figure 8B:
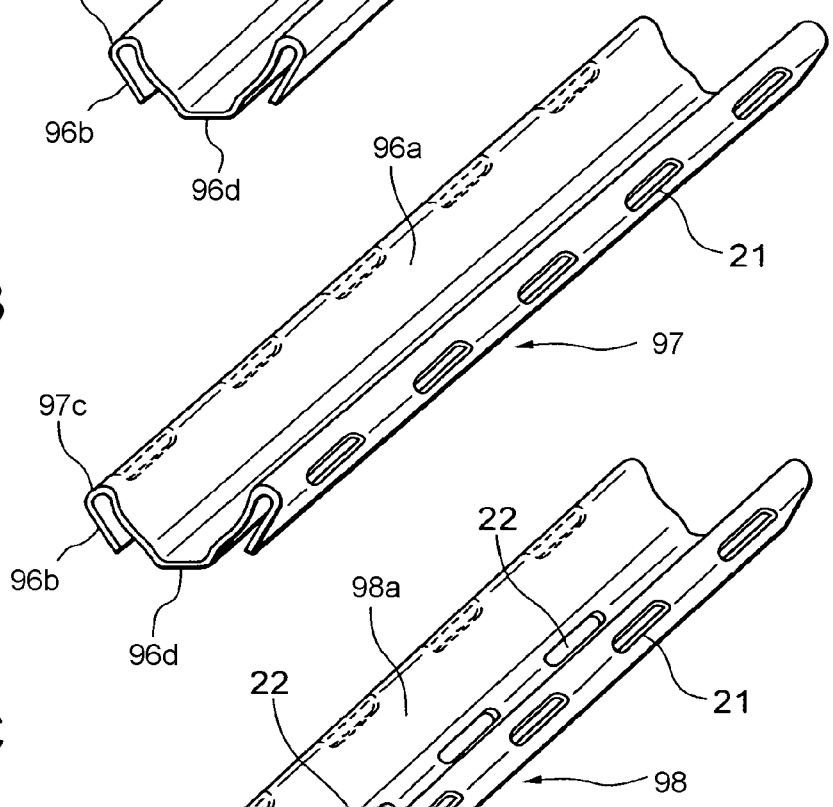
FIG. 8B is a perspective view of the plate spring according to a first modified example of the third embodiment.
Figure 8C:
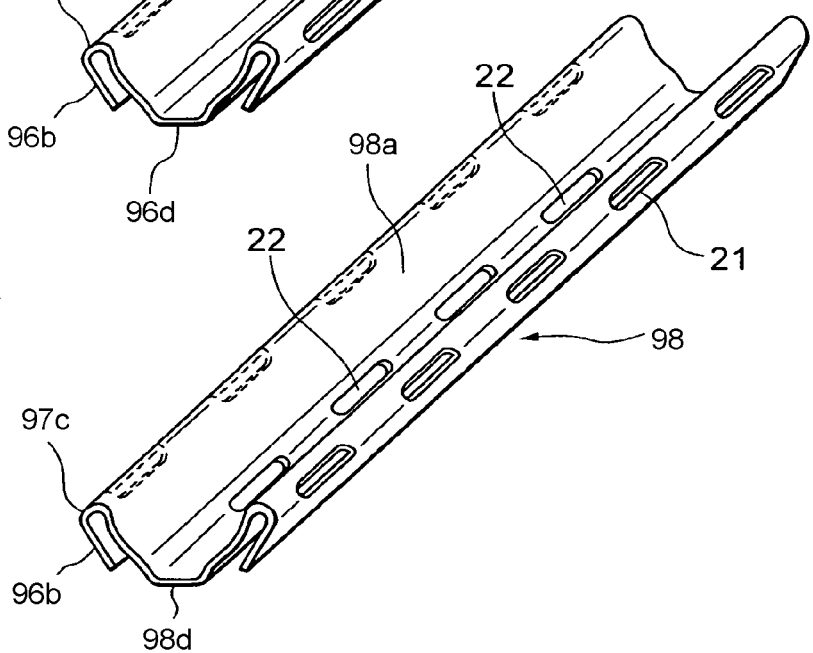
FIG. 8C is a perspective view of the plate spring according to a second modified example of the third embodiment.

FIG. 8A is a perspective view of the plate spring according to the third embodiment. FIG. 8B is a perspective view of the plate spring according to a first modified example of the third embodiment. FIG. 8C is a perspective view of the plate spring according to a second modified example of the third embodiment.

As illustrated in FIGS. 7 and 8, according to the third embodiment, as compared with the first embodiment, the spherical-member-side contact portions 96a abutting on the spherical member 7 each is formed substantially in the circular arc shape. With this configuration, the contact surface pressure can be made lower than in the plane shape. According to the third embodiment, the spherical-member-side contact portions 96a abutting on the spherical member 7 each is formed substantially in the circular arc shape and is therefore set higher than the shaft-side contact portion 96b taking substantially the plane shape. Note that the surface hardness may be, even when uniform on the whole, partially changed as in the first embodiment.

From what has been discussed above, according to the third embodiment, the plate spring 96 is capable of ensuring the sufficient amount of flexure, with the excessive load (stress) being applied to neither the spherical member 7 nor the plate spring 96, and, when transferring the torque, the stress occurred at the contact portions between the spherical member 7 and the plate spring 96 can be reduced. With this contrivance, the high stress does not occur, and the preload performance can be maintained over a long period of time by preventing the [permanent strain] permanent deformation.

Moreover, the contact points with the spherical member 7 are made firmly, and the portions exhibiting the spring property easily flexed, thus making it compatible for the single member to have the race surface and the spring property.

Accordingly, the permanent strain of the plate spring 96 is prevented by hindering the occurrence of the excessive stress on the plate spring 96, thereby enabling the desired preload performance to be maintained over the long period of time. In addition, the dimensional accuracy is not required to be strictly managed, and the plate spring 96 and the race portion can be made from the single material, thereby making it feasible to reduce the manufacturing cost in a way that facilitates the assembling.

Next, FIG. 8B is a perspective view of the plate spring 97 according to a first modified example of the third embodiment. According to the first modified example, the curled portion as the biasing portion 97c of the plate spring 97 are formed with a plurality of holes 21, aligned in the axis-direction, for decreasing the biasing force, thus making it easy for the plate spring 97 to be flexible. With this arrangement, none of the excessive stress is applied to the contact point with the spherical member 7. Namely, when the torque load is applied, the spherical member 7 relatively moves in the rotating direction, however, at this time, the biasing portion 97c (the curled portion) is easily flexed, so that the excessive stress is not applied to the contact point with the spherical member 7. Note that the surface hardness may be, even when uniform on the whole, partially changed as in the first embodiment.

Next, FIG. 8C is a perspective view of the plate spring according to a second modified example of the third embodiment. A bent R-portion at the root of the plate spring 98, which is formed between the spherical-member-side contact portion 98a and the bottom surface 98d, is formed with a plurality of holes 22, aligned in the axis-direction, for decreasing the biasing force, thereby making it easy for the plate spring 98 to be flexible. With this contrivance, none of the excessive stress is applied to the contact points with the spherical member 7. Namely, before the torque load is applied (at which time the stress occurs at the contact points of the plate spring 98 due to the preload generated by assembling), as the portion formed with the hole 22 in the bent R-portion of the plate spring 98 is easily flexed, none of the excessive stress is applied to the contact points of the plate spring 98 with the spherical member 7 when assembled. Note that the surface hardness may be, even when uniform on the whole, partially changed as in the first embodiment.

Fourth Embodiment

Figure 9:
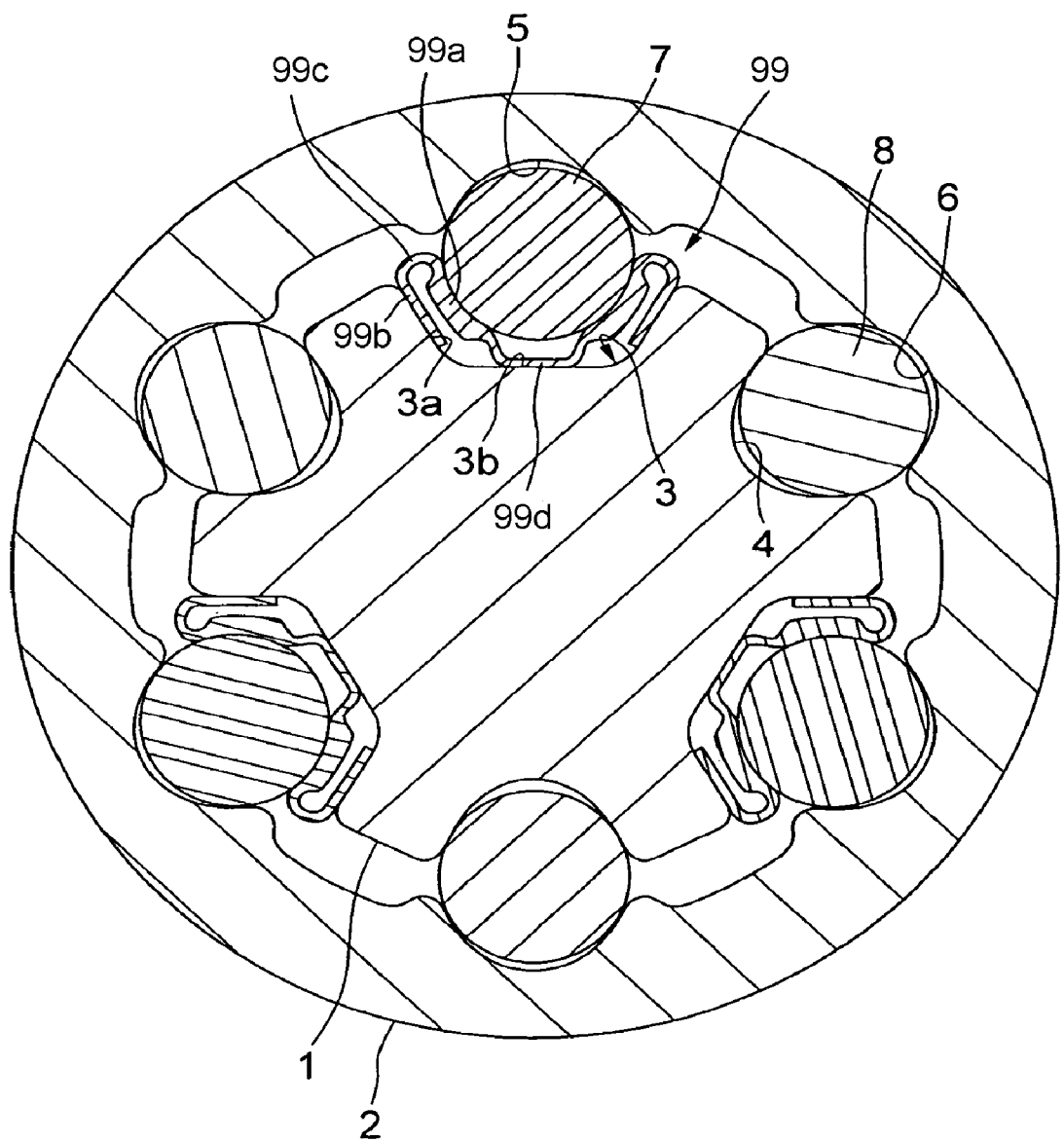
FIG. 9 is a cross sectional view taken along the line X-X in FIG. 2, showing the telescopic shaft for the vehicle steering according to a fourth embodiment of the present invention.

FIG. 9 is a cross sectional view taken along the line X-X in FIG. 2, showing the telescopic shaft for the vehicle steering according to a fourth embodiment of the present invention.

Figure 10A:
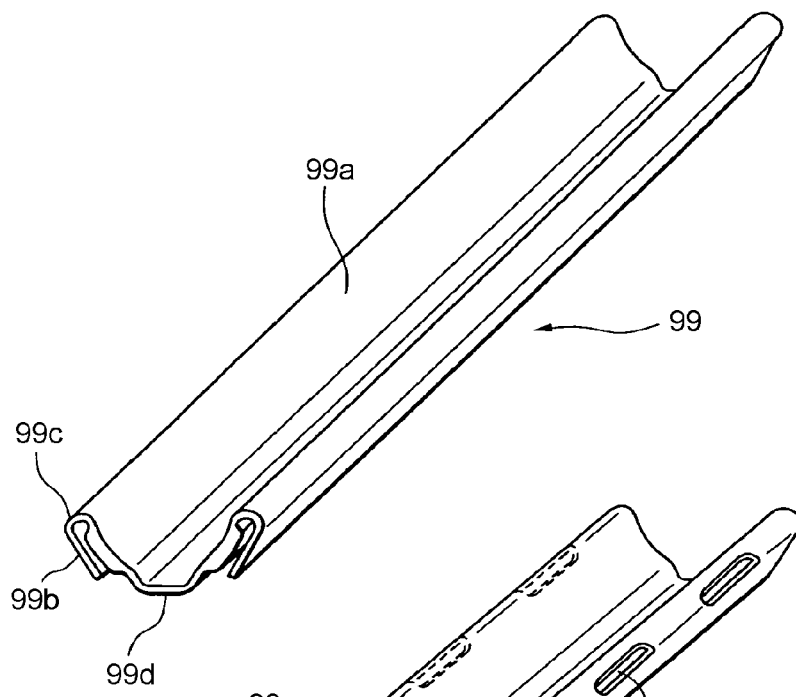
FIG. 10A is a perspective view of the plate spring according to the fourth embodiment.
Figure 10B:
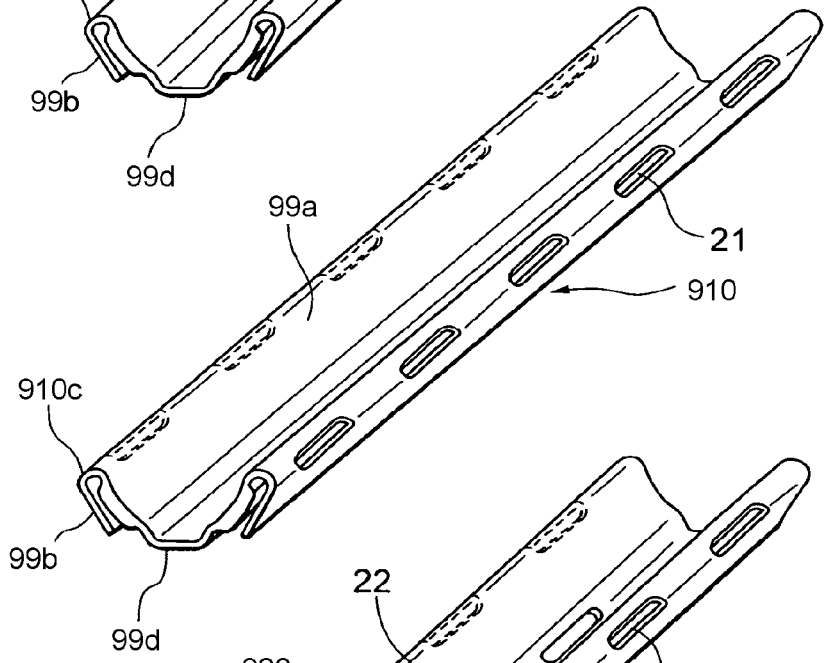
FIG. 10B is a perspective view of the plate spring according to a first modified example of the fourth embodiment.
Figure 10C:
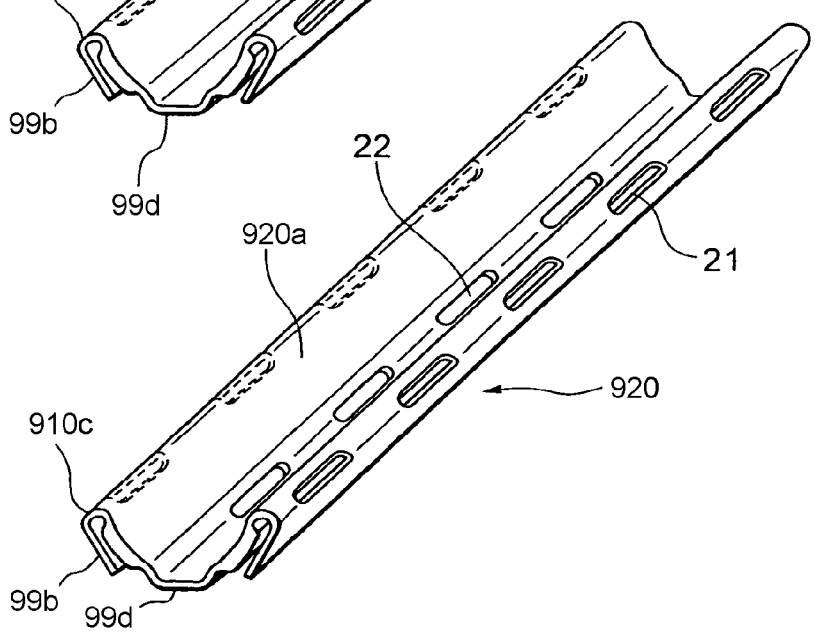
FIG. 10C is a perspective view of the plate spring according to a second modified example of the fourth embodiment.

FIG. 10A is a perspective view of the plate spring according to the fourth embodiment. FIG. 10B is a perspective view of the plate spring according to a first modified example of the fourth embodiment. FIG. 10C is a perspective view of the plate spring according to a second modified example of the fourth embodiment.

As shown in FIGS. 9 and 10A, according to the fourth embodiment, as compared with the first embodiment, the plate thickness of the spherical-member-side contact portion 99a abutting on the spherical member 7 is set thicker than a plate thickness of a portion extending from the shaft-side contact portion 99b to the biasing portion 99c, and the surface abutting on the spherical member 7 is formed substantially in the circular arc shape. With this arrangement, the contact surface pressure with the spherical member 7 can be made lower than in the plane shape. Note that the surface hardness may be, even when uniform on the whole, partially changed as in the first embodiment.

From what has been discussed above, according to the fourth embodiment, the plate spring 99 is capable of ensuring the sufficient amount of flexure, with the excessive load (stress) being applied to neither the spherical member 7 nor the plate spring 99, and, when transferring the torque, the stress occurred at the contact portion between the spherical member 7 and the plate spring 99 can be reduced. With this contrivance, the high stress does not occur, and the preload performance can be maintained over a long period of time by preventing the [permanent strain] permanent deformation.

Moreover, the contact points with the spherical member 7 are made firmly, and the portions exhibiting the spring property are easily flexed, thus making it compatible for the single member to have the race surface and the spring property.

Accordingly, the permanent strain of the plate spring 99 is prevented by hindering the occurrence of the excessive stress on the plate spring 99, thereby enabling the desired preload performance to be maintained over the long period of time. In addition, the dimensional accuracy is not required to be strictly managed, and the plate spring 99 and the race portion can be made from the single material, thereby making it feasible to reduce the manufacturing cost in a way that facilitates the assembling.

Next, FIG. 10B is a perspective view of the plate spring according to a first modified example of the fourth embodiment. According to the first modified example, the curled portions, as the biasing portions 910c of the plate spring 910, are each formed with a plurality of holes 21, aligned in the axis-direction, for decreasing the biasing force. Thus, plate spring 910 is easily flexed. With this arrangement, none of the excessive stress is applied to the contact points with the spherical member 7. Namely, when the torque load is applied, the spherical members 7 relatively move in the rotating direction, however, at this time, the biasing portions 910c are set easy to become flexural, so that the excessive stress is not applied to the contact point with the spherical member 7. Note that the surface hardness may be, even when uniform on the whole, partially changed as in the first embodiment.

Next, FIG. 10C is a perspective view of the plate spring according to a second modified example of the fourth embodiment. A bent R-portion at the root of the plate spring 920, which is formed between the spherical-member-side contact portion 920a and the bottom surface 920d, is formed with a plurality of holes 22, aligned in the axis-direction, for decreasing the biasing force, thereby making plate spring 9 easily flexed. With this contrivance, none of the excessive stress is applied to the contact points with the spherical member 7. Namely, before the torque load is applied (at which time the stress occurs at the contact points of the plate spring 920 due to the preload generated by assembling), as the portion formed with the hole 22 in the bent R-portion of the plate spring 920 is easily flexed, none of the excessive stress is applied to the contact points of the plate spring 920 with the spherical member 7 when assembled. Note that the surface hardness may be, even when uniform on the whole, partially changed as in the first embodiment.

It should be noted that the present invention is not limited to the embodiments discussed above and can be modified in a variety of forms.

As explained above, the elastic members each is provided with the space between the transferring-member-side contact portion abutting on the first torque transferring member and the shaft-side contact portion abutting on the axis-directional groove, and the elastic connection is established therebetween. With this contrivance, when setting, the stress occurred at the contact portion between the first torque transferring member and the elastic member can be reduced, and the desired preload performance can be acquired over the long period of time by preventing the permanent strain of the elastic member due to the permanent deformation.

Furthermore, the elastic member is capable of ensuring the sufficient amount of flexure, and the excessive load (stress) is applied to neither the first torque transferring member nor the elastic member, and hence, when transferring the torque, it is feasible to decrease the stress occurred at the contact point between the first torque transferring member and the elastic member, whereby the preload performance can be maintained over the long period of time by preventing the [permanent strain] permanent deformation without causing the high stress without causing high stress.

Moreover, the contact point with the first torque transmitting member is made firmly, and the portion exhibiting the spring property is easily flexed, thus making it compatible for the single member to have the race surface and the spring property. Further, the structure in the fourth embodiment is that the second torque transferring member mainly transfers the torque, and therefore a further excessive stress is not occurred among the male shaft, the female shaft, the elastic members and the first torque transferring members.

Accordingly, the permanent strain of the elastic member is prevented by hindering the occurrence of the excessive stress on the elastic members, thereby enabling the desired preload performance to be maintained over the long period of time. In addition, the dimensional accuracy is not required to be strictly managed, and the elastic members and the race portions can be made from the single material, thereby making it feasible to reduce the manufacturing cost in a way that facilitates the assembling.

What is claimed is:

1. A telescopic shaft constructed by fitting a male shaft and a female shaft to each other so as to be capable of transmitting torque therebetween and moving axially relative to each other, said telescopic shaft comprising:
   a first torque transferring member interposed via an elastic member between a pair of axis-directional grooves formed respectively on an outer peripheral surface of said male shaft and an inner peripheral surface of said female shaft; and
   said elastic member including:
   a transferring-member-side contact portion abutting on said first torque transferring member;
   a shaft-side contact portion spaced away at a predetermined interval from said transferring-member-side contact portion and abutting on said male shaft or said female shaft; and
   a biasing portion elastically biasing said transferring-member-side contact portion and said shaft-side contact portion away from each other,
   wherein a rigidity of said transferring-member-side contact portion is higher than that of said shaft-side contact portion or of said biasing portion.

2. A telescopic shaft according to claim 1, wherein said biasing portion of said elastic member takes a bent shape bent between said transferring-member-side contact portion and said shaft-side contact portion.

3. A telescopic shaft according to claim 2, wherein a surface hardness of said transferring-member-side contact portion is set higher than a surface hardness of a portion extending from said shaft-side contact portion to said biasing portion.

4. A telescopic shaft according to claim 2, wherein said biasing portion is formed with holes for reducing a biasing force.

5. A telescopic shaft according to claim 2, wherein a plate thickness of said transferring-member-side contact portion is set thicker than a plate thickness of a portion extending from said shaft-side contact portion to said biasing portion.

6. A telescopic shaft according to claim 2, wherein said transferring-member-side contact portion has a contact surface formed substantially in a circular arch cross-sectional shape.

7. A telescopic shaft according to claim 2, wherein said telescopic shaft is used for vehicle steering.

8. A telescopic shaft according to claim 1, wherein said elastic member is constructed of an integral molding product made from plate spring steel.

9. A telescopic shaft according to claim 1, wherein a surface hardness of said transferring-member-side contact portion is set higher than a surface hardness of a portion extending from said shaft-side contact portion to said biasing portion.

10. A telescopic shaft according to claim 1, wherein said biasing portion is formed with holes for reducing a biasing force.

11. A telescopic shaft according to claim 1, wherein a plate thickness of said transferring-member-side contact portion is set thicker than a plate thickness of a portion extending from said shaft-side contact portion to said biasing portion.

12. A telescopic shaft according to claim 1, wherein said transferring-member-side contact portion has a contact surface formed substantially in a circular arch cross-sectional shape.

13. A telescopic shaft according to claim 1, further comprising a second torque transferring member interposed between another pair of axis-directional grooves formed respectively on the outer peripheral surface of said male shaft and the inner peripheral surface of said female shaft.

14. A telescopic shaft according to claim 13, wherein a surface hardness of said transferring-member-side contact portion is set higher than a surface hardness of a portion extending from said shaft-side contact portion to said biasing portion.

15. A telescopic shaft according to claim 13, wherein said biasing portion is formed with holes for reducing a biasing force.

16. A telescopic shaft according to claim 13, wherein a plate thickness of said transferring-member-side contact portion is set thicker than a plate thickness of a portion extending from said shaft-side contact portion to said biasing portion.

17. A telescopic shaft according to claim 13, wherein said transferring-member-side contact portion has a contact surface formed substantially in a circular arch cross-sectional shape.

18. A telescopic shaft according to claim 13, wherein said telescopic shaft is used for vehicle steering.

19. A telescopic shaft according to claim 13, wherein said first torque transferring member is a rolling member rolling when said male shaft and said female shaft make relative axial movements, and
   said second torque transferring member is a slide member sliding when said male shaft and said female shaft make the relative axial movements.

20. A telescopic shaft according to claim 19, wherein said biasing portion of said elastic member takes a bent shape bent between said transferring-member-side contact portion and said shaft-side contact portion.

21. A telescopic shaft according to claim 19, wherein said elastic member is constructed of an integral molding product made from plate spring steel.

22. A telescopic shaft according to claim 19, wherein a surface hardness of said transferring-member-side contact portion is set higher than a surface hardness of a portion extending from said shaft-side contact portion to said biasing portion.

23. A telescopic shaft according to claim 19, wherein said biasing portion is formed with holes for reducing a biasing force.

24. A telescopic shaft according to claim 19, wherein a plate thickness of said transferring-member-side contact portion is set thicker than a plate thickness of a portion extending from said shaft-side contact portion to said biasing portion.

25. A telescopic shaft according to claim 19, wherein said transferring-member-side contact portion has a surface formed substantially in a circular arch cross-sectional shape.

26. A telescopic shaft according to claim 19, wherein said telescopic shaft is used for vehicle steering.

27. A telescopic shaft according to claim 1, wherein said telescopic shaft is used for vehicle steering.

28. A telescopic shaft for vehicle steering, comprising:
a male shaft formed with first and second axis-directional grooves extending in an axis-direction on an outer peripheral surface at an interval of a predetermined angle;
a female shaft disposed coaxially with said male shaft, formed with third and fourth axis-directional grooves extending in the axis-direction on an inner peripheral surface in correspondence with said first and second axis-directional grooves, and fitted onto said male shaft;
a first torque transferring member interposed between said first axis-directional groove of said male shaft and said third axis-directional groove of said female shaft;
an elastic member interposed between said first torque transferring member and said first axis-directional groove of said male shaft, and extending in the axis-direction; and
a second torque transferring member interposed between said second axis-directional groove of said male shaft and said fourth axis-directional groove of said female shaft;
said telescopic shaft being assembled in a steering shaft of a vehicle and constructed by fitting said male shaft and said female shaft to each other so as to be capable of transmitting torque therebetween and moving axially relative to each other,
wherein said elastic member is integrally formed with a first contact portion at which the elastic member is in contact with said first torque transferring member, a second contact portion at which said elastic member is in contact with said groove surface of the male shaft, and a biasing portion which connects said first and second contact portions and elastically holds said first and second contact portions to be spaced apart from each other so as to apply a preload via said first and the second contacting portions, and
the preload caused by said biasing member is so set not to exceed a tolerance value of a surface pressure at said first contact portion against said first torque transferring member.

29. A telescopic shaft for vehicle steering according to claim 28, wherein said first axis-directional groove of said male shaft has side surfaces exhibiting a line symmetry with respect to a diametrical direction and a bottom surface connecting said side surfaces,
said first contact portion of said elastic member includes transferring-member-side contact portions each abutting on said first torque transferring member,
said second contact portion of said elastic member includes groove-surface-side contact portions each abutting on one of said groove side surfaces,
said biasing portion connecting each said transferring-member-side contact portion to a corresponding one of said groove-surface-side contact portions on a side of an outer diameter, and biasing each said transferring-member-side contact portion and the corresponding groove-surface-side contact portion away from each other, and
said elastic member integrally has a connecting portion connecting each said transferring-member-side contact portion to a groove-bottom-surface side contact portion of said elastic member on a side of an inner diameter.

30. A telescopic shaft for vehicle steering according to claim 29, wherein said first torque transferring member is constructed of a plurality of spherical rolling members, and
said second torque transferring member is constructed of a needle roller.

31. A telescopic shaft for vehicle steering according to claim 28, wherein said first torque transferring member is constructed of a plurality of spherical rolling members, and
said second torque transferring member is constructed of a needle roller.

* * * * *